UNITED STATES PATENT OFFICE.

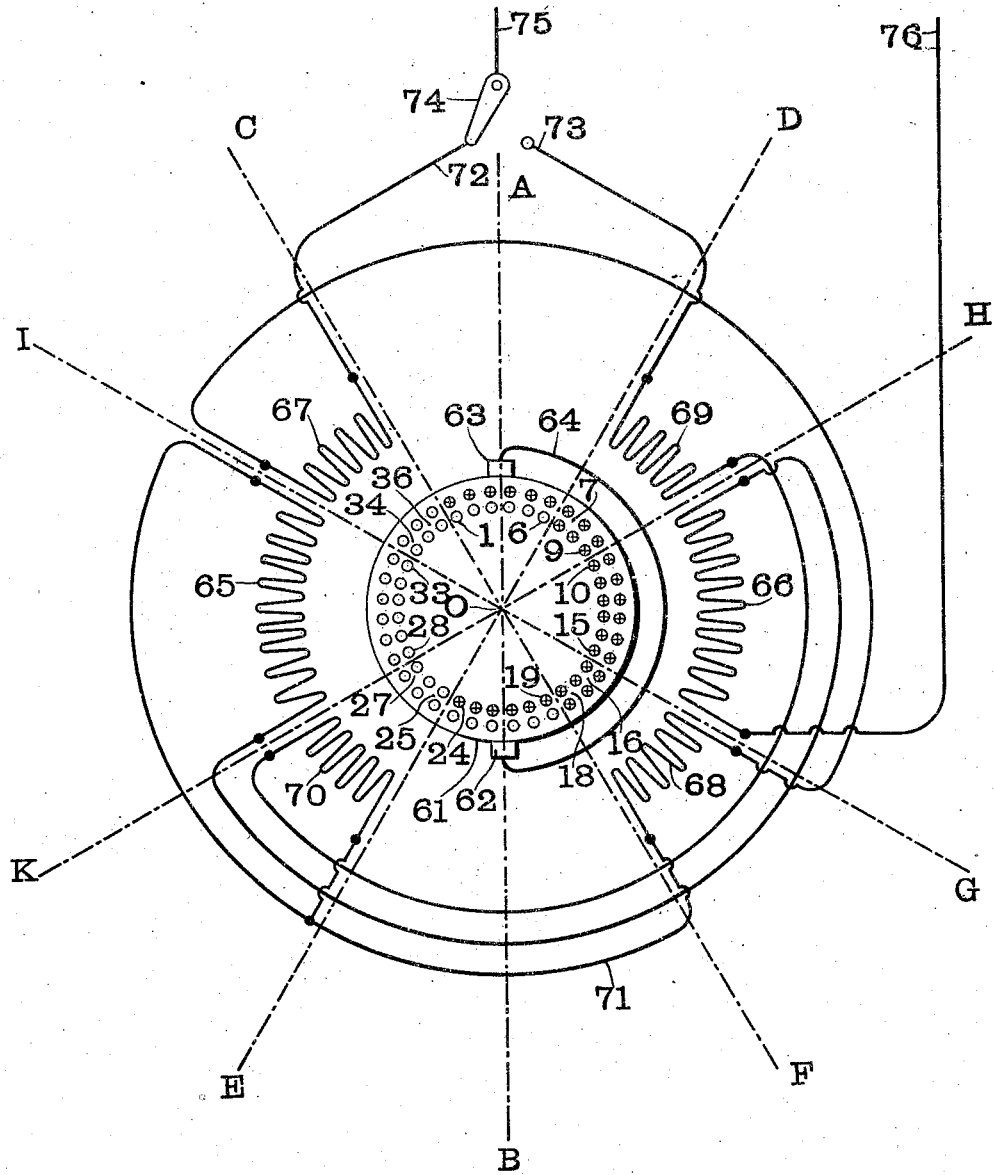

VALÈRE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

952,566.    Specification of Letters Patent.    Patented Mar. 22, 1910.

Application filed June 1, 1909. Serial No. 499,463.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to what are known as repulsion motors. I prefer to designate these machines as series induction motors, and will use this term throughout.

It has been proposed to make use of three angularly displaced windings—*a*, *b*, and *c* on the stator of the said motors connecting *a* with *b* for one direction of rotation, and *a* with *c* for the other direction of rotation, thus avoiding the necessity of shifting the brushes. The three windings always covered the whole circumference of the stator, each covering one third of it, or one of them covering more than one third while each of the two others covered a correspondingly smaller space. I have discovered that a fractional pitch winding on the secondary member has certain valuable advantages, and it is the object of my invention to so modify the stator winding above referred to as to make it equally effective in combination with a fractional pitch winding on the secondary or induced member.

The accompanying drawing shows diagrammatically a two pole self-excited series induction motor embodying my invention.

The revolving induced member is 61 and carries a continuous current fractional pitch winding, disposed in 36 slots with two conductors per slot. The winding pitch is supposed to be about 60% of the pole pitch. Assuming the brushes 62, 63 short-circuited by conductor 64, to be bearing directly on the commuted winding, then the current distribution in the conductors will be approximately as indicated by the circles and dots near the rotor periphery. In practice a commutator would of course be used, but this would not alter the current distribution in any way, although the space position of the brushes relatively to the stator windings may thereby be altered as is well understood. It is seen that the ampere turns in slots 1 to 6 inclusive and 19 to 24 inclusive are neutralized owing to the fractional pitch and that effective ampere turns only appear within the angles DOF and COE. I may dispose my three stator windings so as to span approximately the same angles. One of these stator windings is 65, 66 and is disposed coaxially with the brush line AOB; another stator winding is 67, 68 and is displaced with respect to the first; the third stator winding is 69, 70 and is displaced with respect to each of the others.

In the preferred arrangement, that winding which is coaxial with the brush axis is made to span the greater part of the active belts within DOF and COE, the two others are symmetrically disposed on each side of the first and span smaller but equal parts of the active belts. All three windings are connected together at one end by a common conductor 71; one end of the larger winding 65, 66 is directly connected to the main 76; the ends of the other two windings are connected to the points 72 and 73 of a two way switch 74, by means of which either point may be connected to main 75. The direction of rotation is determined by switch 74. If it stands on 72 the motor revolves in one direction, if it stands on 73 it revolves in the opposite direction.

Assume switch 74 to be standing on point 72, then winding 69, 70 is out of circuit and the active stator winding only spans the angles COK and HOE, inducing in the rotor a current distributed as shown by dots and circles. It is seen at once that the whole of the flux set up by the rotor ampere turns within the angles COK and HOF, except of course the leakage flux due to these ampere turns, will be directly neutralized by the coaxial ampere turns in the active inducing winding on the stator. The rotor ampere turns in slots 7 to 9 inclusive and 25 to 27 inclusive, produce a magnetization which is neither coaxial nor at right angles to the active stator winding. Those ampere turns will, therefore, be only partly neutralized by the stator inducing winding; they can be divided into two sets of ampere turns, the one coaxial with the active stator winding, the other at right angles to it. The former will be neutralized, but the latter will not be neutralized and will produce the motor field at right angles to the active stator winding. When the direction of rotation is reversed, then it is the ampere turns within the angles COI and FOG which are partly neutralized and partly responsible for the motor field.

By means of the arrangement described, I secure among other advantages the very important one of producing the motor field by means of part of the ampere turns induced in the rotor, hence I refer to this motor as "self-excited". I further reduce the primary and secondary leakage to the smallest possible value by providing that all the rotor ampere turns, which are not required for producing the motor field, are neutralized by stator ampere turns situated in closest proximity thereto, and by providing that those rotor ampere turns which are neutralized by the fact that a fractional pitch is used on that member, are not in close proximity to any stator windings.

The number of rotor exciting ampere turns can be controlled, for instance, by increasing or decreasing the span of stator windings 65, 66 relatively to the span of the two others, the sum of the arcs spanned by the three always remaining substantially equal to the sum of the arcs spanned by the active rotor conductors.

Having fully described my invention, what I claim as new and desire to secure by Letters Patent of the United States is:

1. In a motor, the combination with a rotor provided with a fractional pole pitch winding short-circuited by means of brushes along a stationary axis, of a stator provided with a main winding and two auxiliary windings adapted to coöperate with said main winding, the sum of the arcs spanned by said main and auxiliary windings corresponding to the sum of the arcs spanned by the active rotor conductors, and means for cutting one or the other of said auxiliary windings out of effective operation.

2. In a motor, the combination with a rotor provided with a fractional pole pitch winding short-circuited by means of brushes along a stationary axis, of a stator provided with a main winding and two auxiliary windings each spanning a smaller arc than the main winding and adapted to coöperate with said main winding, the sum of the arcs spanned by said main and auxiliary windings corresponding to the sum of the arcs spanned by the active rotor conductors, and means for cutting one or the other of said auxiliary windings out of effective operation.

3. In a motor, the combination with a rotor provided with a fractional pole pitch winding short-circuited by means of brushes along a stationary axis, of a stator provided with a main winding and two auxiliary windings adapted to coöperate with said main winding, the sum of the arcs spanned by said main and auxiliary windings corresponding to the sum of the arcs spanned by the active rotor conductors, and means for cutting one or the other of said auxiliary windings out of effective operation, the stator windings being all connected together at one end.

4. In a motor, the combination with a rotor provided with a fractional pole pitch winding short-circuited by means of brushes along a stationary axis, of a stator provided with a main winding and two auxiliary windings adapted to coöperate with said main winding, the sum of the arcs spanned by said main and auxiliary windings corresponding to the sum of the arcs spanned by the active rotor conductors, and a switch for cutting one or the other of said auxiliary windings out of effective operation.

5. In an electric motor, a member provided with a fractional pole pitch winding, a second member provided with a main winding permanently in circuit and composed of a plurality of diametrically opposite sections, auxiliary windings for said member and each composed of a plurality of sections situated between the sections of said main winding, and means for cutting one or the other of said auxiliary windings into effective operation, the sum of the arcs spanned by said main and auxiliary windings corresponding to the sum of the arcs spanned by the active conductors on the first named member.

In testimony whereof I have hereunto set my hand and affixed my seal in the presence of the two subscribing witnesses.

VALÈRE ALFRED FYNN [L. S.]

Witnesses:
ELIZABETH BAILEY,
E. E. HUFFMAN.